United States Patent
Ballocchi et al.

(10) Patent No.: US 11,472,569 B2
(45) Date of Patent: Oct. 18, 2022

(54) AIRCRAFT ELECTRICAL ISOLATION COMPONENT AND METHOD OF MANUFACTURING ELECTRICAL ISOLATION COMPONENT

(71) Applicant: SHORT BROTHERS PLC, Belfast (GB)

(72) Inventors: Paolo Ballocchi, Dundrum (GB); Robert Walsh, Belfast (GB); Nigel Donaldson, Mews Moira (GB)

(73) Assignee: SHORT BROTHERS PLC, Belfast (GB)

( * ) Notice: Subject to any disclaimer, the term of this patent is extended or adjusted under 35 U.S.C. 154(b) by 593 days.

(21) Appl. No.: 16/481,258

(22) PCT Filed: Jan. 25, 2018

(86) PCT No.: PCT/GB2018/050205
§ 371 (c)(1),
(2) Date: Jul. 26, 2019

(87) PCT Pub. No.: WO2018/142108
PCT Pub. Date: Aug. 9, 2018

(65) Prior Publication Data
US 2019/0375517 A1 Dec. 12, 2019

(30) Foreign Application Priority Data

Feb. 6, 2017 (GB) ...................... 1701899

(51) Int. Cl.
*B64D 45/02* (2006.01)
*B64D 37/32* (2006.01)
(Continued)

(52) U.S. Cl.
CPC ................ *B64D 45/02* (2013.01); *B32B 7/12* (2013.01); *B64D 37/32* (2013.01); *F16B 43/00* (2013.01);
(Continued)

(58) Field of Classification Search
CPC .......... F16B 43/00; F16B 43/02; F16B 21/12; F16B 43/001; B32B 7/12; B32B 5/02;
(Continued)

(56) References Cited

U.S. PATENT DOCUMENTS 3,495,907 A * 2/1970 Rogers .................... G01L 1/241
73/761
3,873,168 A * 3/1975 Viola ...................... F16C 33/20
428/113
(Continued)

FOREIGN PATENT DOCUMENTS

DE 10313611 A1 10/2004
EP 2028100 A1 2/2009

OTHER PUBLICATIONS

United Kingdom Search Report dated Apr. 26, 2017, for United Kingdom Patent Application No. GB 1701899.5.
(Continued)

*Primary Examiner* — Danny Nguyen
(74) *Attorney, Agent, or Firm* — Hovey Williams LLP

(57) ABSTRACT

A structural assembly of an aircraft has a fastener extending into first and second structural members. A washer is disposed between the fastener and one of the structural members to electrically insulate the fastener and the structural members. The washer has a core of reinforcement fibers supported in a thermoplastic matrix material. Electrically-insulating outer layers of glass fibers overlay the core.

23 Claims, 12 Drawing Sheets

(51) Int. Cl.
*F16B 43/00* (2006.01)
*H01B 17/30* (2006.01)
*B32B 7/12* (2006.01)
*F16B 21/12* (2006.01)

(52) U.S. Cl.
CPC ......... *F16B 43/001* (2013.01); *H01B 17/305* (2013.01); *F16B 21/12* (2013.01)

(58) Field of Classification Search
CPC  B32B 3/12; D03D 1/00; D03D 13/00; D06M 15/37; H05F 3/00; B64D 45/02; B64D 37/32; H01B 17/305; H01B 17/30
USPC ........................................................ 361/218
See application file for complete search history.

(56) References Cited

U.S. PATENT DOCUMENTS

| | | | |
|---|---|---|---|
| 4,027,865 A | 6/1977 | Greenwood et al. | |
| 4,963,215 A | 10/1990 | Ayers | |
| 5,489,180 A * | 2/1996 | Ichihara | F16B 43/00 52/167.7 |
| 6,129,326 A * | 10/2000 | Mandon | B32B 1/00 428/626 |
| 8,413,929 B2 | 4/2013 | Kamino et al. | |
| 2002/0187020 A1* | 12/2002 | Julien | F16B 1/0014 411/544 |
| 2007/0258182 A1* | 11/2007 | Morrill | F16B 43/001 361/216 |
| 2009/0003965 A1* | 1/2009 | Gregg | B60N 2/015 414/800 |
| 2010/0021268 A1* | 1/2010 | Dean | F16B 43/00 411/542 |
| 2015/0086267 A1* | 3/2015 | Valembois | F16B 21/12 403/404 |
| 2017/0298980 A1* | 10/2017 | Cheng | F16B 43/00 |

OTHER PUBLICATIONS

International Search Report and Written Opinion dated Apr. 13, 2018, for International Patent Application No. PCT/GB2018/050205.

* cited by examiner

AIRCRAFT ELECTRICAL ISOLATION COMPONENT AND METHOD OF MANUFACTURING ELECTRICAL ISOLATION COMPONENT

CROSS-REFERENCE TO RELATED APPLICATION(S)

This patent application is a U.S. National Stage entry from International Patent Application No. PCT/GB2018/050205, filed on Jan. 25, 2018, which claims priority to United Kingdom Patent Application No. GB 1701899.5, filed on Feb. 6, 2017, the entire contents of both of which are incorporated herein by reference.

FIELD OF THE INVENTION

This relates to electrical isolation in aircraft, and in particular, to composite electrical isolation devices.

BACKGROUND OF THE INVENTION

Composite materials are becoming more widely used in aircraft due to their strength and weight characteristics.

The use of composite materials may also present challenges. For example, in flight, aircraft can be struck by lightning. To safely dissipate electrical energy associated with a lightning strike, aircraft structures are often designed to distribute electrical current throughout the aircraft in a safe manner. Many composite materials are non-conductive or have relatively low electrical conductivity, which can pose challenges for safe electrical current dissipation during a lightning strike.

SUMMARY OF THE INVENTION

An example structural assembly of an aircraft comprises: first and second structural members; a fastener extending into the structural members; and a washer disposed between the fastener and one of the structural members and electrically insulating a surface of the fastener from the one of the structural members, the washer comprising: a core comprising reinforcement fibers supported in a thermoplastic matrix material; and an electrically-insulating outer layer overlaying the core, the outer layer comprising glass fibers, the reinforcement fibers and the glass fibers formed of different materials.

Preferably said electrically-insulating outer layer comprises first and second electrically-insulating plies comprising the glass fibers, said first and second electrically-insulating plies defining top and bottom surfaces of said washer.

Preferably said core comprises a plurality of core plies comprising carbon fibers.

Preferably said core comprises at least three of said core plies.

Preferably each of said core plies comprises woven carbon fabric.

Preferably said core plies are oriented such that weave patterns of their woven carbon fabric are at a non-zero angle to one another.

Preferably an epoxy sealant is applied to at least a portion of an external surface of said washer.

Preferably the assembly includes a metallic expansion sleeve, and said washer is configured to withstand a load applied to deform said expansion sleeve during installation of the fastener.

Preferably said washer is configured to resist electrical arcing between the one of said structural members and said fastener during a lightning strike.

Preferably said fastener comprises a threaded shaft and a nut.

Preferably the surface of said fastener electrically insulated from the one of said structural members is a surface of the nut.

Preferably said first structural member is metallic and said second structural member is non-metallic, and said washer is configured to resist electrical arcing between the first structural member and said fastener.

Preferably said fastener extends into a fuel tank of the aircraft.

Preferably said first structural member and said second structural member are non-metallic.

Preferably the assembly includes a third structural member, wherein said fastener extends into said first, second and third structural members.

An example washer for receiving a fastener therethrough comprises: a core formed of reinforcement fibers supported in a thermoplastic matrix material; an electrically-insulating outer layer overlaying the core, the outer layer comprising glass fibers, the reinforcement fibers and the glass fibers formed of different materials.

Preferably said reinforcement fibers comprise carbon fibers.

Preferably said electrically-insulating layer comprises first and second electrically-insulating plies comprising the glass fibers, said first and second electrically-insulating plies defining top and bottom surfaces of said washer.

Preferably said core comprises a plurality of core plies, each comprising carbon fibers embedded in a thermoplastic matrix material.

Preferably said core comprises at least three of said core plies.

Preferably each of said core plies comprises woven carbon fabric.

Preferably said plies of woven carbon fabric comprise woven yarns, and said plies are oriented such that their yarns are at a non-zero angle to one another.

Preferably an epoxy sealant is applied to at least a portion of an external surface of said washer.

Preferably said washer is configured to withstand a compressive load from an aircraft fastener.

Preferably said washer is for installation in a fastener assembly comprising a metallic expansion sleeve, and said washer is configured to withstand a compressive load applied to deform said expansion sleeve.

Preferably said washer is for installation between a fastener and a substrate, to resist electrical arcing between said fastener and said substrate during a lightning strike.

An example method of manufacturing an electrical isolation component, comprises: overlaying an outer ply comprising glass fibers on a core preform comprising reinforcing fibers and a thermoplastic matrix material; applying pressure to the outer ply and core preform, thereby causing consolidation of the reinforcing fibers and matrix material; removing the pressure to allow the thermoplastic material to harden, thereby forming a laminate structure from the outer ply and the consolidated reinforcing fibers and matrix material.

Preferably the method includes cutting a washer from said laminate structure.

Preferably said reinforcing fibers comprise carbon fibers.

Preferably said core and said at least one outer ply are pressed between opposing dies.

Preferably said core and said at least one outer ply are pressed between opposing rollers.

Preferably said core comprises a plurality of core plies, each core ply including a sheet of carbon fiber cloth with a thermoplastic material applied thereto.

Preferably the method includes stacking said at least one outer ply and said plurality of core plies and applying pressure to the stack to consolidate said carbon fiber cloth with said thermoplastic material.

Preferably said at least one outer ply comprises an outer ply on a top surface of said core and an outer ply on a bottom surface of said core.

Preferably cutting said washer comprises cutting using a water jet.

An example electrical isolation component for insertion between components of an aircraft structural assembly, comprises: a core formed of reinforcing fibers embedded in a thermoplastic matrix material.

Preferably the isolation component includes an electrically-insulating outer ply overlaying said core, said outer ply comprising glass fibers, said reinforcing fibers and said glass fibers formed of different materials.

Preferably the isolation component includes first and second electrically-insulating plies formed of glass fiber, said first and second electrically-insulating plies defining top and bottom surfaces of said isolation component.

Preferably said core comprises a plurality of core plies.

Preferably said core comprises at least three of said core plies.

Preferably each of said core plies comprises woven carbon fabric.

Preferably the weave patterns of said plies of woven carbon fabric are at non-zero angles to one another.

Preferably an epoxy sealant is applied to at least a portion of a surface of said isolation component.

Preferably said isolation component is a shim.

DETAILED DESCRIPTION OF EMBODIMENT(S) OF THE INVENTION

The present disclosure relates to electrical isolation components comprising composite materials. In various embodiments, washers, shims and other components are disclosed having composite construction including a core of reinforcing fibers embedded in a thermoplastic matrix material and a fiberglass outer layer covering the core. The components disclosed herein may be used to protect against electrical arcing on aircraft, for example, during lightning strikes.

Figure 1A:
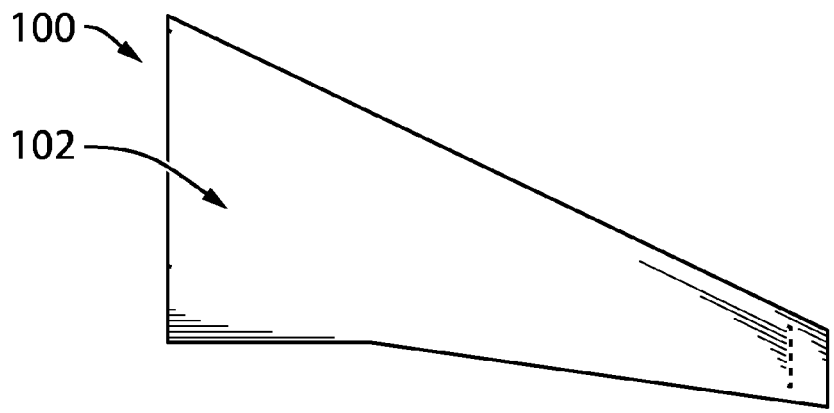
FIGS. 1A-1C are schematic views of an aircraft wing.
Figure 1B:
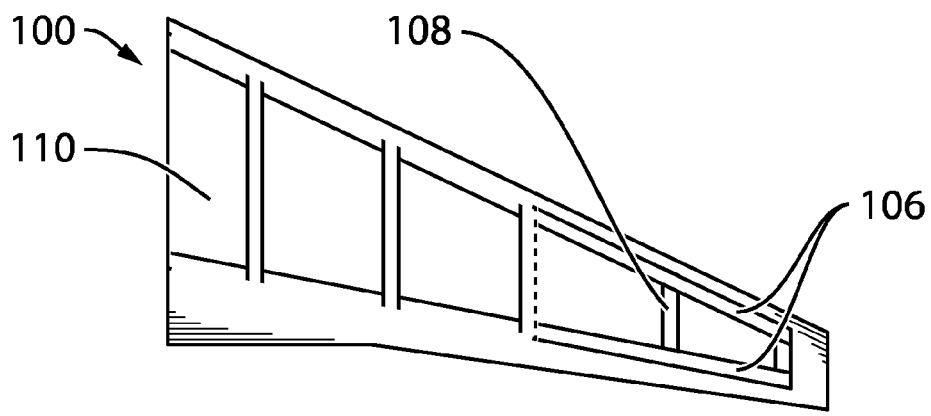
Figure 1C:
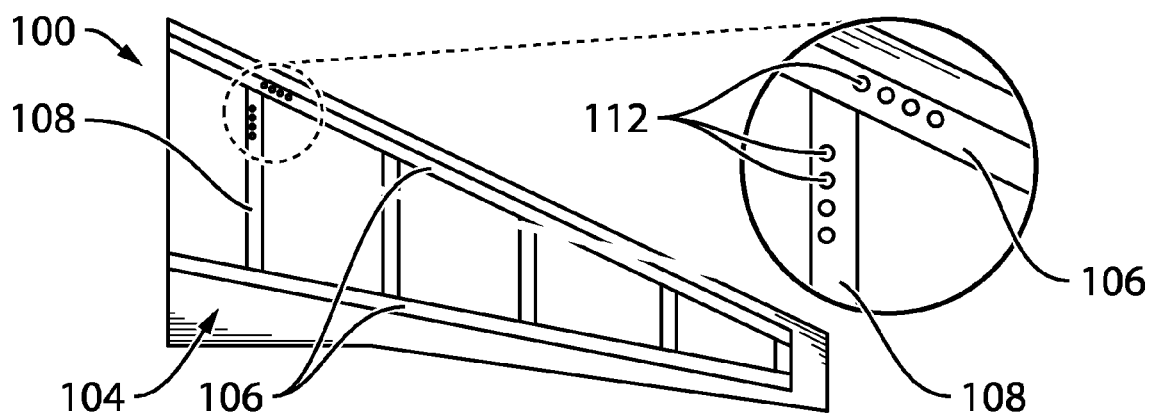

FIGS. 1A-1C depict a wing torque box 100 of an aircraft in top schematic view. FIG. 1A depicts the wing torque box 100 with a skin panel 102. FIG. 1B depicts the wing torque box 100 with the skin removed to show internal spars 106 and ribs 108. As shown in FIG. 1B, wing torque box 100 defines a fuel tank 110, bounded by skin panel 102, spars 106 and ribs 108. FIG. 1C depicts the wing torque box 100 without the fuel tank 110 indicated, to show spars 106 and ribs 108 and with an enlarged portion showing installed fasteners. Wing torque box 100 has structural components such as one or more wing skin panels 102 (e.g. upper and lower panels), front and rear spars 106 and a plurality of ribs 108. One or more fuel tanks 110 may be at least partially defined by skin panels 102, spars 106 and ribs 108. Other structural or systems components may be partially or fully enclosed within fuel tank 110.

Skin panels 102 are fastened to spars 106, ribs 108 using fasteners 112. In some embodiments, the wing skin may be defined by a single upper panel 102 and a single lower panel 102. In other embodiments, the wing skin may include multiple panels 102 defining each of the upper and lower skin surfaces. Fasteners 112 may be installed along each interface between components, and in particular, where skin panels 102 overlie spars 106 and ribs 108. Some fasteners 112 may extend through skin panels 102, spar 106 or ribs 108 into fuel tank 110. Other fasteners 112 may be wholly contained within fuel tank 110. For simplicity, only four fasteners 112 are shown in FIG. 1. However, any number of fasteners 112 may be present on wing 100.

Components of wing 100 may be formed from numerous different materials. Some components, including structural components such as ribs 108, may be metallic; e.g. titanium, aluminum or alloys thereof, while structural components such as skin panels 102, spars 106 and ribs 108 and other aircraft components may be formed from composite materials, such as carbon-fiber reinforced polymers or other fibre-reinforced polymers. Still other wing components may be formed from materials such as titanium, steel, fiberglass, plastics, or the like.

During operation, wing 100 may be subjected to lightning strikes. Lightning strikes introduce high-voltage electrical current, which may propagate and be distributed over the wing 100. Conduction by metal components generally promotes safe distribution of electrical current. However, non-conductive components may interfere with propagation of electrical current, creating voltage differentials across components and a consequent risk of sparks or electrical arcing. As will be apparent, such arcing may pose an ignition hazard, particularly in the vicinity of fuel tank 110.

Figure 2A:
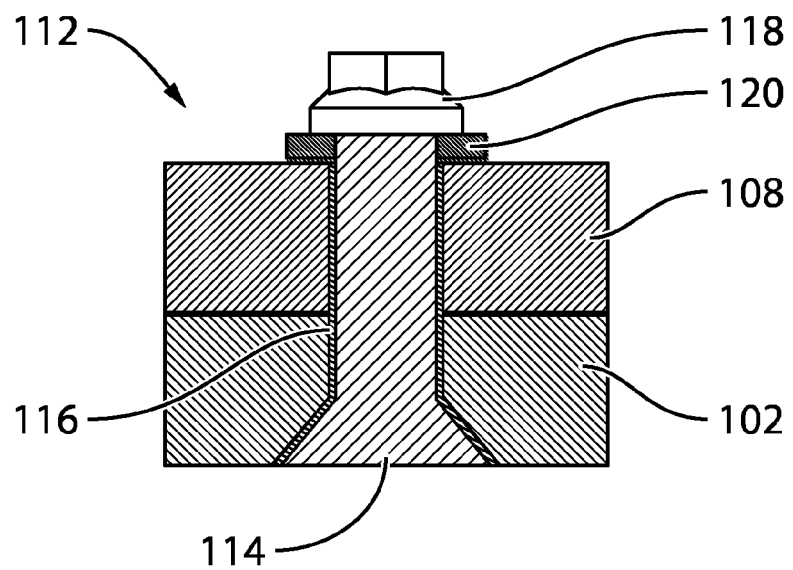
FIGS. 2A-2B are cross-sectional views of structural assemblies of the wing of FIG. 1, including a fastener.
Figure 2B:
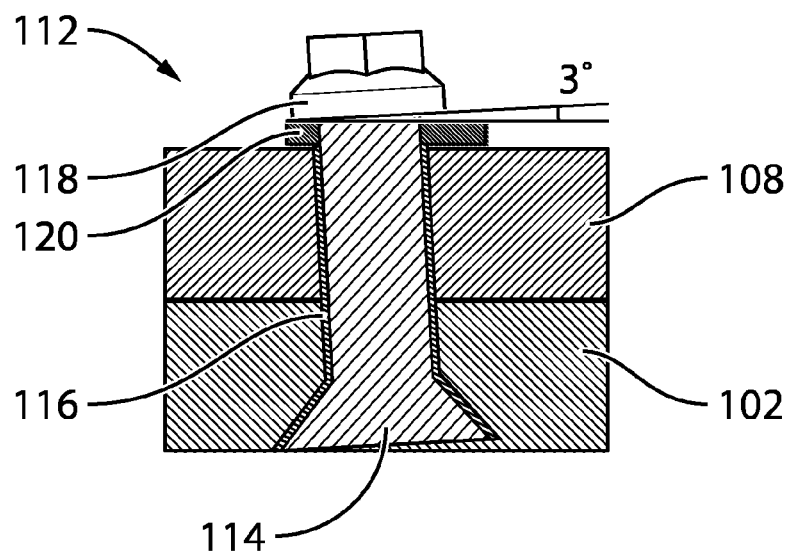

FIGS. 2A and 2B depict a cross-sectional view of a structural assembly including first and second structural members, namely a skin panel 102 and a rib 108, held together by a fastener 112. Fastener 112 includes a metallic shaft 114 such as the shaft of a bolt, rivet or the like. In the depicted embodiment, shaft 114 comprises a shaft which may be received in a sleeve 116. Shaft 114 extends into the skin panel 102 and rib 108 (individually and collectively referred to as the substrate), and fastener 112 includes and is secured by a metallic nut 118 receiving the end of shaft 114.

An electric isolation component is positioned between nut 118 the substrate. As depicted, the electric isolation component is a washer 120.

In the event of a lightning strike, high-voltage electrical current propagates over the wing. Current may, for example, be conducted across the interface between fastener 112 and the substrate and may potentially arc between components. Because of the high voltage and current generated by a lightning strike, current may flow through all available conductive paths. For example, electrical current may flow between fastener 112 and skin panel 102 (e.g. a partially-conductive composite skin panel 102) through the interface of the fastener shaft 114 with the skin panel. Likewise, electrical current may flow though the shaft 114 to the nut 118 and between the fastener 112 and the spar 106 or rib 108 through which it is received. Differences in electrical potential across components may make the assembly prone to arcing, e.g. between nut 118 and rib 108.

Washer 120 has a diameter larger than that of nut 118. In some examples, washer 120 has an inside diameter of about 0.511 in and an outside diameter of between 0.79 in and 0.9 in and nut 118 has a diameter of approximately 0.77 in. Washer 120 at least partially insulates nut 118 from the substrate (e.g. rib 108). That is, washer 120 resists electrical conduction and arcing between rib 108 and the face of nut 118 that opposes rib 108. Washer 120 is sufficiently large to reduce or eliminate the likelihood of electrical arcing between nut 118 and shaft 114 or spar 106.

Sleeve 116 is an expansion sleeve and has an internal bore smaller than the diameter of shaft 114, such that reception of shaft 114 into sleeve 116 deforms and expands sleeve 116 into contact with the substrate, e.g. skin panel 102 and rib 108. Such expansion may require a large torque to be applied to shaft 114, thereby generating a large clamping force between shaft 114 and nut 118. In some embodiments, nut 118 and shaft 114 are tightened together to a torque of approximately 520 lbf-in and generate a clamping force of approximately 9000 lb. In typical aircraft applications fasteners 112 are tightened to between 20 to 3600 lbf-in, however, these loads may vary. In some embodiments, sleeve 116 may be omitted and shaft 114, nut 118 may directly engage the substrate.

The clamping force causes nut 118 to bear against washer 120, transferring the clamping force to the washer 120. In some circumstances, such as in the event of misalignment of shaft 114, nut 118 or washer 120, the load on washer 120 may be concentrated on a small portion of the washer's surface. For example, FIG. 2B shows a fastener 112 with shaft 114 and nut 118 misaligned by an angle of 3°.

Shaft 114, sleeve, 116 nut 118 and rib 108 are metallic and may therefore be good electrical conductors. For example, shaft 114, sleeve 116 and nut 118 may be titanium or an alloy thereof. Rib 108 may be aluminum, titanium or an alloy thereof. Skin panel 102 is non-metallic and may be a poor electrical conductor. Thus, if an electric charge is applied (e.g. by a lightning strike), electrical arcs may be possible, e.g. between rib 108 and nut 118. Washer 120 may therefore be constructed to provide resistance against electrical arcing. That is, washer 120 may be constructed of an electrically insulating material. However, washer 120 may also need to be constructed using materials sufficiently strong to withstand clamping forces associated with installation. Moreover, washer 120 may turn or otherwise move during installation and operation, causing washer 120 to rub against nut 118 and spar 106. Therefore, washer 120 may also be constructed to resist abrasion.

Some plastics (e.g. injection-molded thermoplastics) are good electrical insulators. However, such plastics typically lack the requisite strength and toughness to reliably withstand loading by fastener 112. Conversely, metals may be sufficiently strong, but do not provide electrical insulation. Insulating coatings are available, but such coatings are prone to scratching, which may permit conduction of electrical current. Composite materials based on carbon fibers in a thermoset (e.g. epoxy) matrix may be relatively strong, but are very time consuming and expensive to make. For example, such materials typically require extended curing times under specific conditions such as elevated temperature, pressure or the like.

Figure 3:
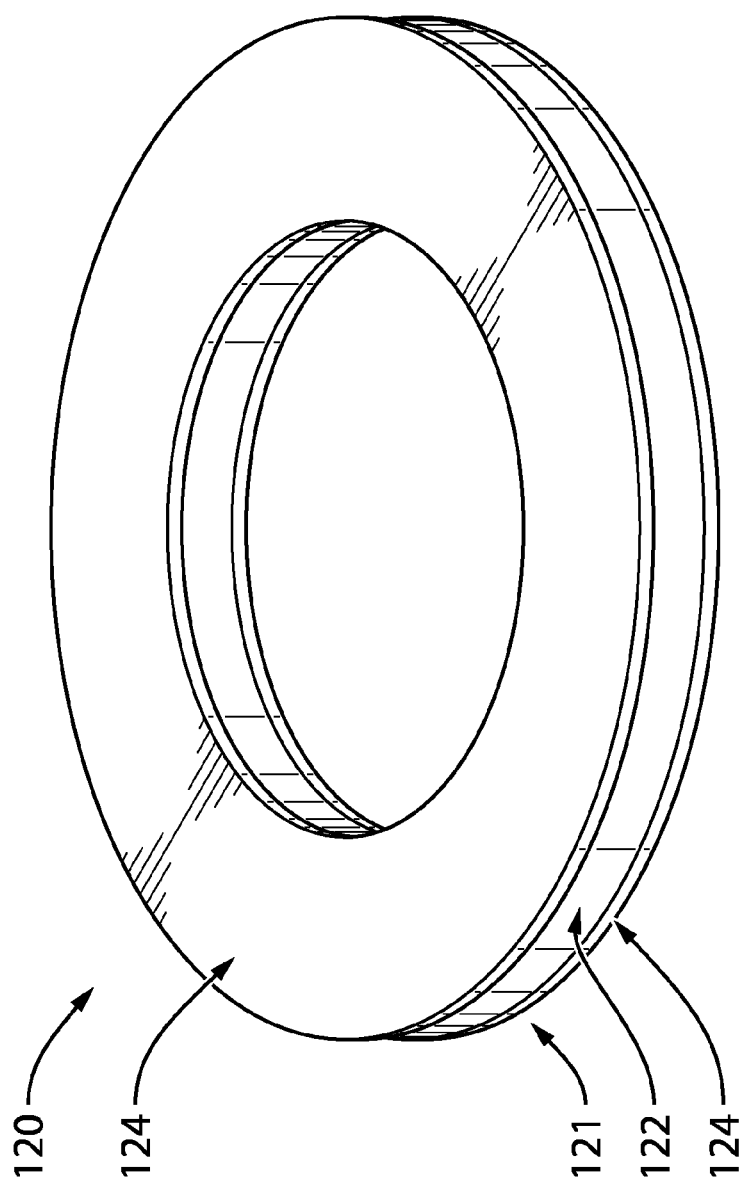
FIG. 3 is a perspective view of a washer.

FIG. 3 depicts a composite washer 120 configured for use in aircraft 100. Washer 120 has a core 121 with one or more core plies 122 and a cover with one or more outer plies 124. As described in further detail below, a core ply 122 is constructed of a thermoplastic matrix material, with embedded reinforcing fibers. The reinforcing fibers of core plies 122 and outer plies 124 may be formed of different materials. For example, the composition of core plies 122 may provide strength, while outer plies 124 may be constructed of an electrically-insulating and abrasion-resistant material such as fiberglass.

Figure 4A:
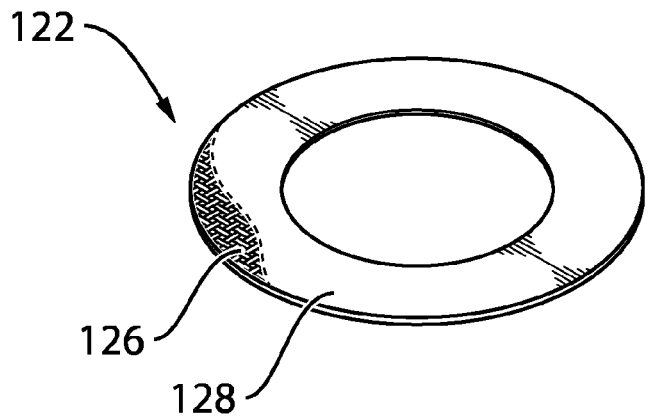
FIG. 4A is a partial cutaway view of the washer of FIG. 3.

FIG. 4A depicts an example core ply 122. As noted, core ply 122 comprises a thermoplastic matrix 128 with reinforcing fiber material. The thermoplastic matrix 128 is partially removed in FIG. 4A to show the reinforcing fiber material.

Figure 4B:
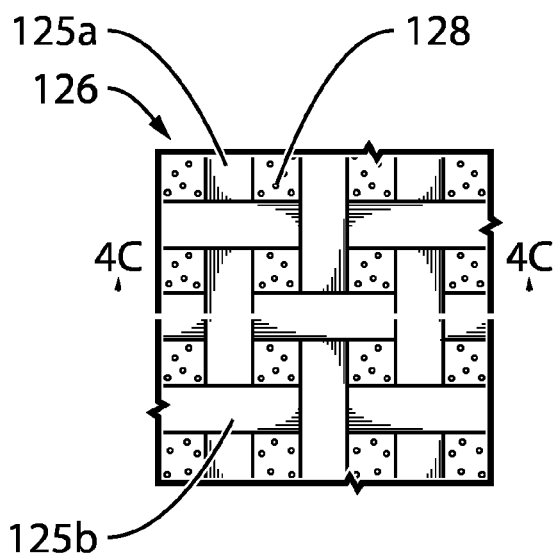
FIG. 4B is an enlarged view of a woven carbon fiber fabric.
Figure 4C:
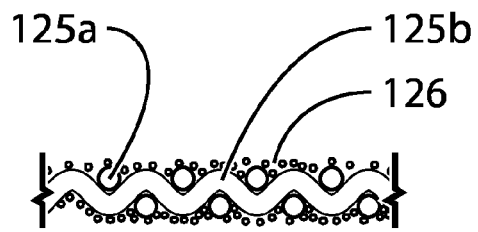
FIG. 4C is a cross-sectional view of the fabric of FIG. 4B, along line 4C-4C.

As depicted, the reinforcing material is a carbon fibre sheet 126. The sheet includes a plurality of carbon filaments, which may be grouped into bundles or yarns 125. The yarns may be woven together. FIG. 4B shows an enlarged partial view of carbon fiber sheet 126, showing the weave pattern of yarns 125. Matrix material 128 is distributed on, in and around the yarns 125 defining sheet 126. As depicted, yarns 125 are woven in a lattice pattern, with first yarns 125a at a first orientation and second yarns 125b at a second orientation, at approximately a 90 degree angle to yarns 125a. FIG. 4C shows a cross-sectional view of yarns 125 woven in such a pattern. Each yarn 125b is woven through yarns 125a in an alternating over-under pattern. Such fabric may be isotropic or quasi-isotropic. Other arrangements are possible. For example, yarns 125 may have the same orientation, such that they are parallel to one another, or yarns 125 may have different orientations at angles other than 90 degrees to one another, or yarns 125 may have random orientations.

In the depicted embodiment, yarns 125 of carbon fabric 124 are made up of approximately 3000 filaments. Such fabric may be referred to as 3K fabric. In an example, the filament thickness is approximately 5 microns and fabric 124 defines a ply thickness of about 0.31 mm. However, the filament thickness may differ in other embodiments. Bundles of filaments may define yarns of thickness dependent on bundle shape, weave pattern, etc.

Other fabrics may be used. For example, fabrics with more or fewer filaments per bundle or with differently-sized filaments may be used. Alternatively, carbon filaments may be distributed randomly or in a single bundle, rather than in discrete yarns. The chosen fabric may be selected based on specifications such as strength, thickness and weight in view of the loads to which washer 120 is expected to be subjected.

The carbon fibers of core 121 are embedded in a thermoplastic matrix material 128. Matrix material 128 may be solid at room temperature and atmospheric pressure, but may be flowable when warmed or subjected to high pressure. After reaching a flowable state, matrix 128 will cool and harden after removal of the high temperature or pressure.

The matrix material may, for example, be poly etherether ketone (PEEK), poly ether ketone ketone (PEKK), polyphenylene sulfide (PPS), Polyphenylene sulfone (PPSU), polyamides such as polyphthalamide (PPA) or the like. Matrix material 128 may be applied to the reinforcing fibers by powder-coating or by forcing a liquid containing the matrix material through the reinforcing fibers. Matrix material may be applied to individual filaments or to individual yarns 125 prior to weaving into sheet 126. Alternatively, a woven sheet 126 may be power-coated or liquid coated after weaving.

In another embodiment, rather than applying matrix material by powder or liquid coating, filaments of matrix material may be commingled with reinforcing fiber filaments. For example, each yarn 125 may have approximately 3000 filaments, of which a proportion are filaments of matrix material.

Matrix material 128 and reinforcing fibers are consolidated together to form a composite structure. That is, after matrix material 128 is distributed with reinforcing fibers, the matrix material 128 is at least partially melted by application of heat, pressure or both, so that the matrix material 128 flows together to form a structure with the reinforcing fibers.

Matrix material 128 and reinforcing fibers may be present in core ply 122 in a volume fraction of about 60% reinforcing fibers. In some examples, reinforcing material may form approximately 60%+/−3%.

Figure 5:
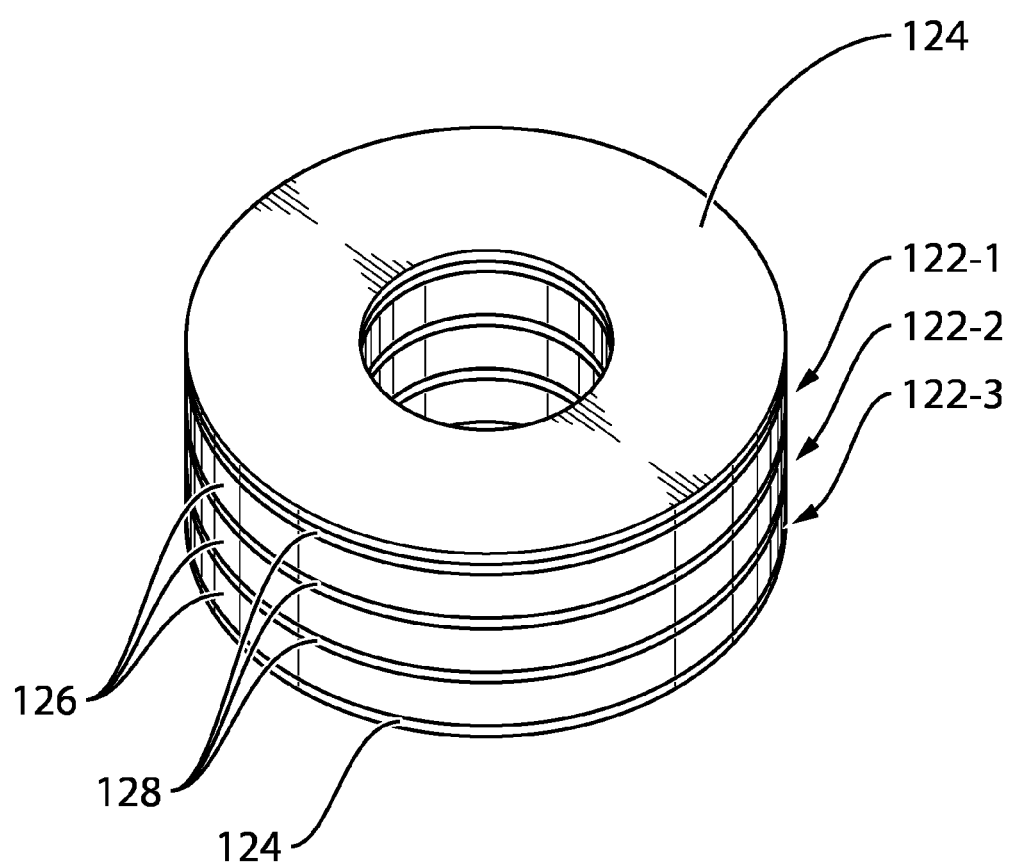
FIG. 5 is a perspective view of another washer.

In some embodiments, washer 120 may have a core 121 with multiple layers, which may be referred to as plies. For example, as depicted in FIG. 5, washer 120 has three core plies 122-1, 122-2, 122-3, each of which includes a carbon fabric sheet 126 and matrix material 128. The core plies 122-1, 122-2, 122-3 may have different orientations, such that their yarns 125 are positioned at an angle to one another. Alternatively or additionally, core plies 122-1, 122-2, 122-3 may have different weave patterns. For example, one ply 122-1 may have yarns 125 in a lattice pattern as shown in FIG. 4B, while another ply 122-2 has yarns 125 that are parallel to one another, and third ply 122-3 has filaments at random orientations.

For purposes of illustration, carbon fabric 126 and matrix material 128 are shown in FIG. 5 as discrete layers with exaggerated thickness. However, matrix material 128 may be distributed through and around carbon fabric 126 to define a single ply of mixed composition.

Referring to FIG. 3, outer ply 124 is formed of an electrically insulating material. The material of outer ply 124 may also be selected to provide abrasion resistance or to limit friction between washer 120 and the adjacent fastener or substrate material. As depicted, outer ply 124 is formed of woven glass fibres, e.g. glass cloth such as EGlass 8 HS 105GSM. Outer ply 124 may be thin relative to core 121. In an example, each outer ply is approximately 0.04 mm thick and each core ply 122 is approximately 0.31 mm thick.

Figure 6:
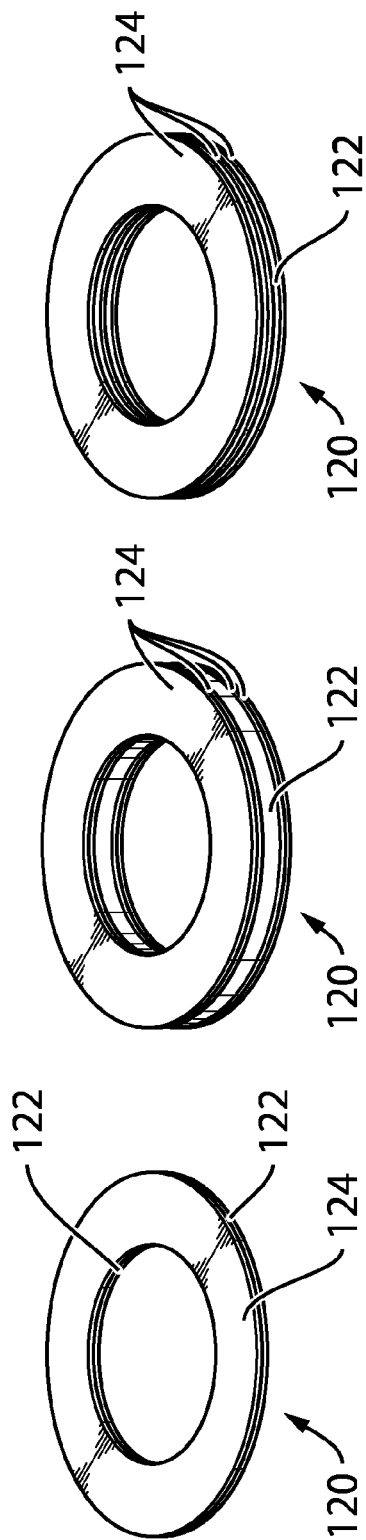
FIGS. 6A-6C are perspective views of washers.

As depicted in FIG. 4, washer 120 has a cover including two outer plies 124, one on each of the top and bottom faces of the washer. In other embodiments, washer 120 may have more or fewer outer plies 124. For example, an outer ply 124 may be provided on only one of the top and bottom surfaces of washer 120, as shown in FIG. 6A. Alternatively, multiple outer plies 124 may be stacked on the top and bottom surfaces of washer 120, as shown in FIG. 6B, or outer plies 124 may be located between core plies 122 as shown in FIG. 6C.

Each outer ply 124 may provide resistance against conduction of electrical current. Thus, conduction or arcing of electricity across washer 120 may be prevented, up to a breakdown voltage. That is, arcs may be prevented unless a voltage greater than or equal to the breakdown voltage is applied across the washer 120. The breakdown voltage may depend, for example, on the diameter and width of washer 120, the diameter of nut 118 in contact with washer 120, the thickness of each core ply 122 and the total thickness of the core, and the thickness and number of outer plies 124. The breakdown voltage may be increased, for example, by increasing the outer diameter of washer 120 relative to the bearing surface of nut 118, increasing the number or thickness of outer plies 124, applying non-conductive surface coatings or sealing washer 120 in a sealant. Conversely, thinner outer plies 124 or a smaller number of outer plies may decrease the breakdown voltage.

Washer 120 may be coated with a sealant such as an epoxy lacquer. The sealant may be applied to the edges of washer 120 and its top and bottom surfaces.

Figure 7:
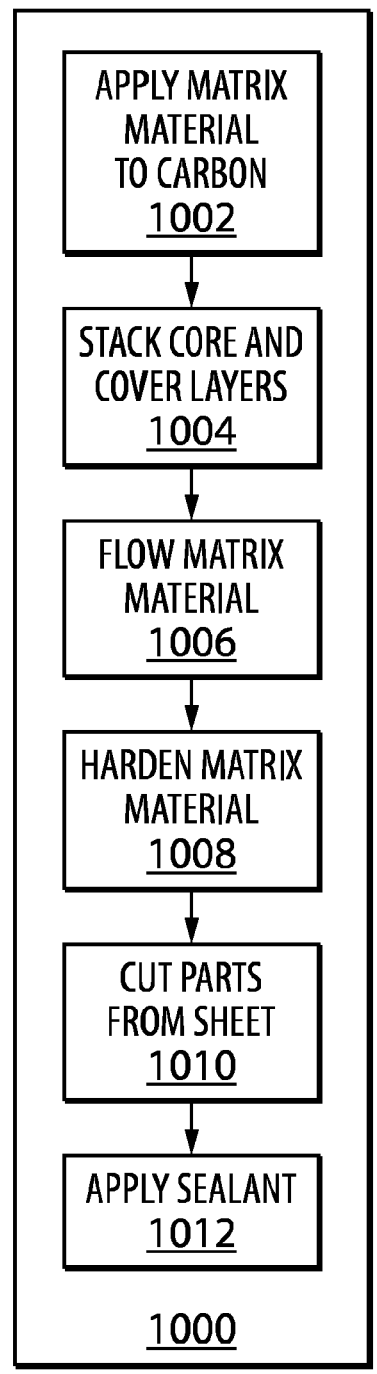
FIG. 7 is a flow chart showing a method of manufacturing a washer.

FIG. 7 is a flow chart showing an example process 1000 of manufacturing a washer 120. At block 1002, one or more sheets of prepreg material is formed. As noted, the prepreg may be formed by powder coating thermoplastic matrix material onto or forcing liquid matrix material through a sheet of carbon fiber (e.g. a sheet of woven carbon fiber fabric).

At block 1002 one or more plies of cover material (e.g. fiberglass cloth) is formed.

Figure 8A:
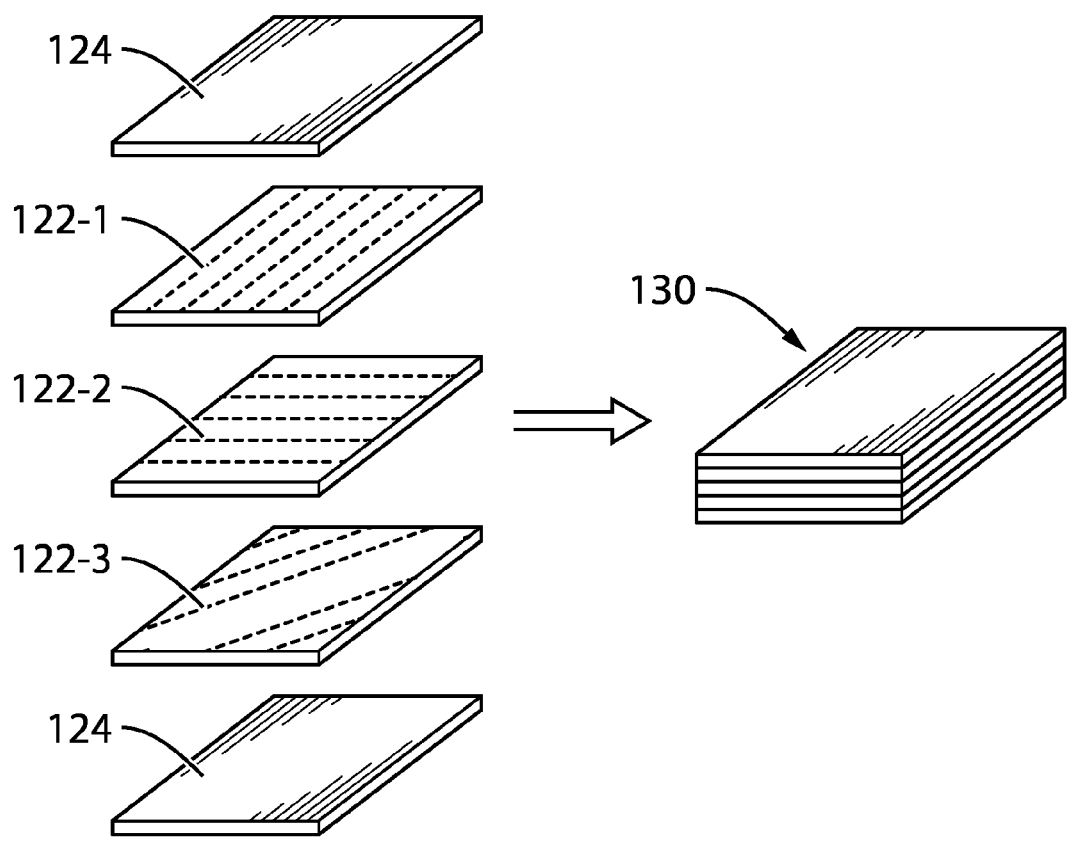
FIGS. 8A-8E are schematic diagrams showing example stages of the method of FIG. 7.

At block 1004, the plies of cover material and prepreg material are stacked. The plies are sheets may be laid flat atop one another as shown in FIG. 8A. As shown in FIG., core plies 122 may be oriented such that carbon filaments of core plies 122 extend at an angle to one another. For example, as shown in FIG. 8A, core ply 122-2 is oriented at approximately a 90 degree angle to core ply 122-1, and core ply 122-3 is oriented at approximately a 45 degree angle to both core plies 122-1 and 122-2. Likewise, outer plies 124 may be oriented such that glass fibers are at an angle to one another and to carbon filaments of the adjacent core ply 122.

Figure 8B:
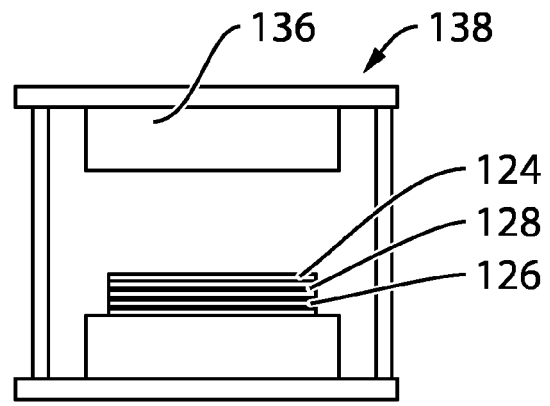
Figure 8C:
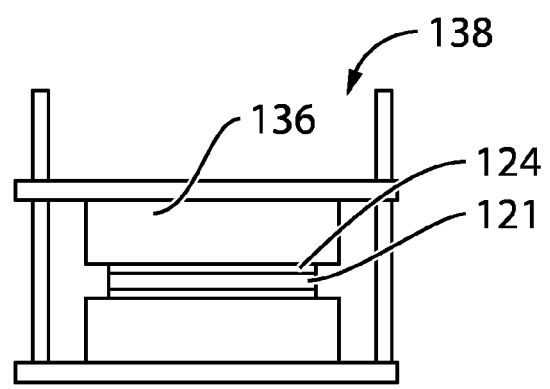

At block 1006, core plies 122 and outer plies 124 are pressed together. The plies 122 and plies 124 may be pressed together in a die press. For example, as shown in FIGS. 8B-8C, the stack of core plies 122 and outer plies 124 are placed between dies 136 of a press 138. Press 138 is closed to compress the stack between dies 136 as shown in FIG. 8C. Pressure exerted by the dies causes matrix material 128 to at least partially melt into a flowable condition. Once in such a state, matrix material 128 flows into and around the reinforcing fibers of core plies 122 and adheres to outer plies 124. Press 138 may be held in the closed position of FIG. 8C for a consolidation period, sufficient to allow flowing of matrix material 128 to fully consolidate core 121. In some embodiments, pressing may occur at temperature. In other embodiments, plies 122, 124 or the pressing device may be heated prior to pressing. Such heating may reduce the amount of pressure required to cause flowing of matrix material 128. In some examples, the consolidation period is between approximately 15-30 minutes at a temperature of about 370-400° C. and a pressure of about 100-300 psi.

Figure 8D:
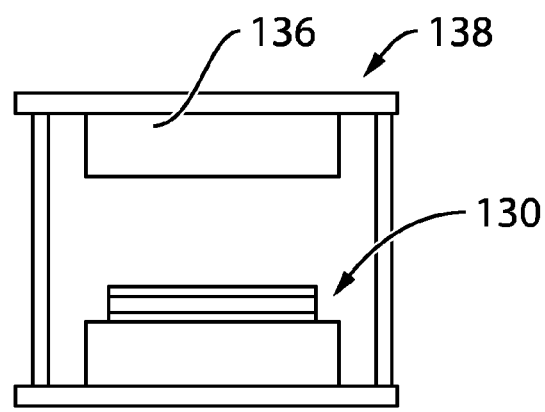
Figure 8E:
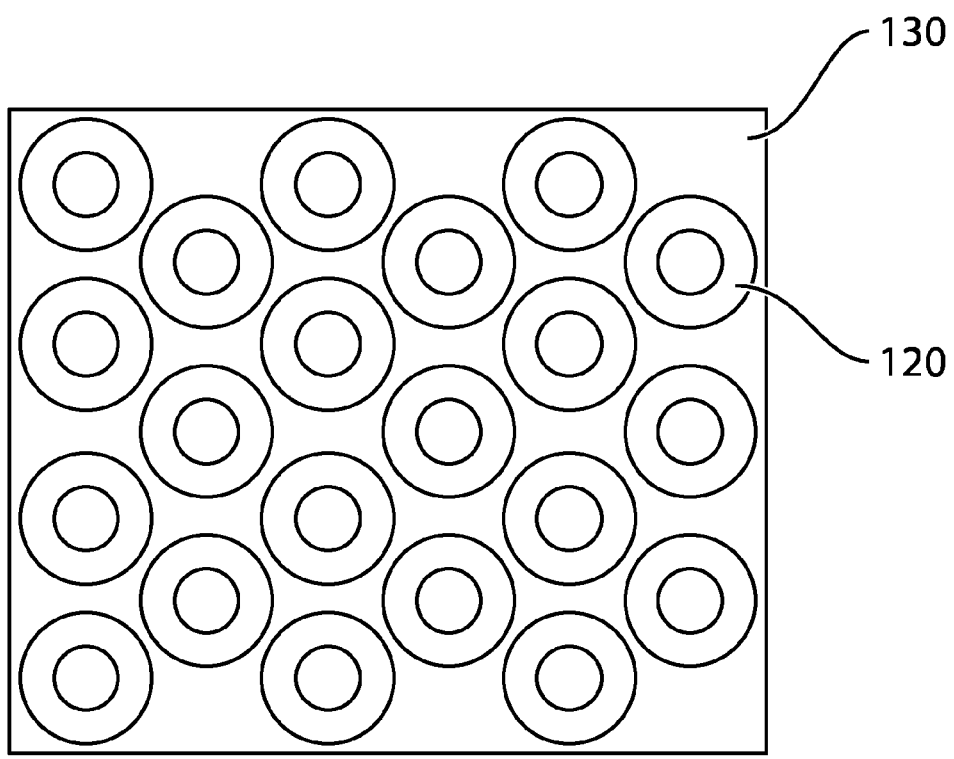

At block 1008, after pressing of plies 122, 124 and consequent flowing of thermoplastic matrix material, pressure may be partially or fully released. For example, as shown in FIG. 8D, press 138 is opened to release pressure. Plies 122, 124, including matrix material 128 may cool, causing the matrix material to return to a solid state. The solidified matrix material 128 holds core plies 122 together to define a washer core 121 and binds outer plies 124 to the core 121. Plies 122, 124 then define an insulation sheet 130. In some examples, plies 122, 124 are cooled to room temperature at a rate cut of between 5-20° C. per minute.

At block 1010, insulation sheet 130 is removed from the pressing device (e.g. by separating die halves and lifting the sheet 130). A plurality of washers 120 are cut from insulation sheet 130. The washers may be cut, for example, using water jets or another suitable cutting technique.

At block 1012, the cut parts are finished by application of a sealant such as an epoxy glaze. The sealant may be electrically insulating and may be applied at least to the edges of washers 120. In some embodiments, sealant may also be applied to the top and bottom surfaces of washers 120.

Figure 9:
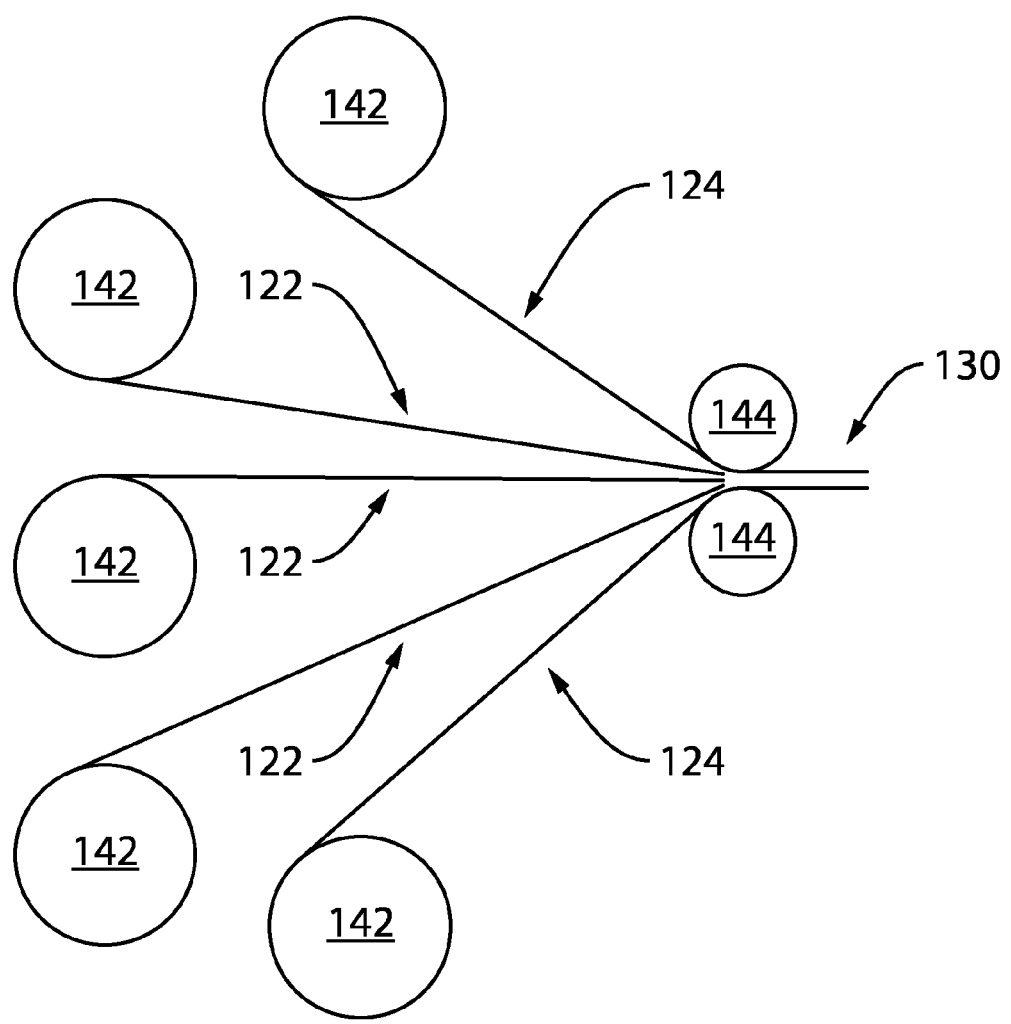
FIG. 9 is a schematic diagram showing alternate example stages of the method of FIG. 7.

In some embodiments, rather than being pressed between dies of a press, prepreg and cover material may be dispensed from rolls 140 and compressed in a stack between rollers 142 as shown in FIG. 9. Matrix material 128 may at least partially melt and flow during compression by rollers 142. After exiting rollers 142, matrix material 128 cools and hardens, and the consolidated material may then be cut into insulation sheets 130.

Figure 10:
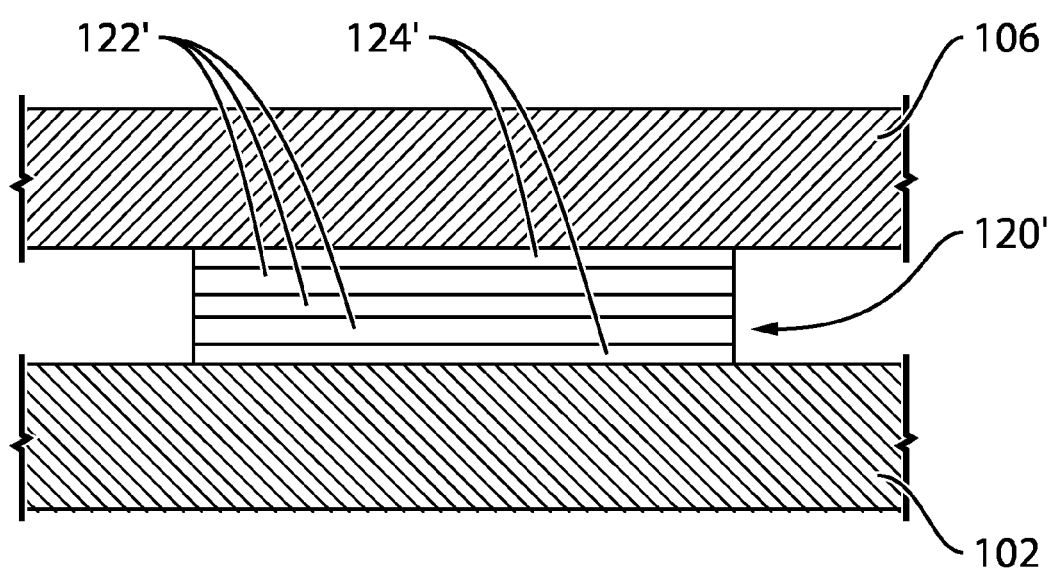
FIG. 10 is a schematic diagram showing an electrical isolation component interposed between aircraft structural members.

As described above, electrically isolating washers are formed of composite material including one or more core plies of carbon fiber embedded in a thermoplastic matrix, and one or more insulative glass fiber outer plies. However, in other embodiments, such material may be used to form other aircraft components. For example, such material may be used for relatively low-cost and lightweight washers or other fastener components that are not installed for electrical isolation. Additionally, such material may be used for bushings, sleeves, or the like. Moreover, such material may be used for other components which occupy space between aircraft structures for electrical isolation of the aircraft structure. For example, material as disclosed herein may be used to form shims to occupy space between and electrically isolate aircraft skin panels and structural members such as a wing spar or rib, or between adjacent structural members. FIG. 10 shows an example of such an embodiment. As depicted, a shim 120' is interposed between a skin panel 102 and spar 106 to occupy space and to electrically isolate skin panel 1-2 from spar 106. Shim 120' has a composite structure similar to that of washer 120. Specifically, shim 120' is a laminate including two outer layers 124' of a material comprising glass fibers, and a core comprising core plies 122' of reinforcing fibers, such as carbon fibers, embedded in a thermoplastic matrix. Shim 120' may be used, for example, to provide electrical isolation between structural components proximate or associated with fuel tank 110, particularly between skin panels 120 and spars 106 or ribs 108 and between spars 106 and ribs 108.

Although embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. Rather, As can be understood, the detailed embodiments described above and illustrated are intended to be examples only. The invention is defined by the appended claims.

What is claimed is:

1. A structural assembly of an aircraft comprising:
first and second structural members;
a fastener extending into said structural members;
a washer disposed between said fastener and one of said structural members and electrically insulating a surface of said fastener from the one of said structural members, said washer comprising:
a core comprising reinforcement fibers supported in a thermoplastic matrix material, and
an electrically-insulating outer layer overlaying the core, said outer layer comprising glass fibers, said reinforcement fibers and said glass fibers formed of different materials; and
a metallic expansion sleeve, wherein said washer is configured to withstand a load applied to deform said expansion sleeve during installation of the fastener.

2. The assembly of claim 1, wherein said electrically-insulating outer layer comprises first and second electrically-insulating plies comprising the glass fibers, said first and second electrically-insulating plies defining top and bottom surfaces of said washer.

3. The assembly of claim 1, wherein said core comprises a plurality of core plies comprising carbon fibers.

4. The assembly of claim 3, wherein said core comprises at least three of said core plies.

5. The assembly of claim 3, wherein each of said core plies comprises woven carbon fabric.

6. The assembly of claim 5 wherein said core plies are oriented such that weave patterns of their woven carbon fabric are at a non-zero angle to one another.

7. The assembly of claim 1, comprising an epoxy sealant applied to at least a portion of an external surface of said washer.

8. The assembly of claim 1, wherein said washer is configured to resist electrical arcing between the one of said structural members and said fastener during a lightning strike.

9. The assembly of claim 1, wherein said fastener comprises a threaded shaft and a nut.

10. The assembly of claim 8, wherein the surface of said fastener electrically insulated from the one of said structural members is a surface of the nut.

11. The assembly of claim 1, wherein said first structural member is metallic and said second structural member is non-metallic, and said washer is configured to resist electrical arcing between the first structural member and said fastener.

12. The assembly of claim 1, wherein said fastener extends into a fuel tank of the aircraft.

13. The assembly of claim 1, wherein said first structural member and said second structural member are non-metallic.

14. The assembly of claim 1, comprising a third structural member, wherein said fastener extends into said first, second and third structural members.

15. A washer for receiving a fastener therethrough, the washer comprising:
a core formed of reinforcement fibers supported in a thermoplastic matrix material; and
an electrically-insulating outer layer overlaying the core, said outer layer comprising glass fibers, said reinforcement fibers and said glass fibers formed of different materials,
wherein said washer is configured to withstand a compressive load from an aircraft fastener,
wherein said washer is for installation in a fastener assembly comprising a metallic expansion sleeve, and said washer is configured to withstand a compressive load applied to deform said expansion sleeve.

16. The washer of claim 15, wherein said reinforcement fibers comprise carbon fibers.

17. The washer of claim 15, wherein said electrically-insulating layer comprises first and second electrically-insulating plies comprising the glass fibers, said first and second electrically-insulating plies defining top and bottom surfaces of said washer.

18. The washer of claim 15, wherein said core comprises a plurality of core plies, each comprising carbon fibers embedded in a thermoplastic matrix material.

19. The washer of claim 18, wherein said core comprises at least three of said core plies.

20. The washer of claim 18, wherein each of said core plies comprises woven carbon fabric.

21. The washer of claim 20, wherein said plies of woven carbon fabric comprise woven yarns, and wherein said plies are oriented such that their yarns are at a non-zero angle to one another.

22. The washer of claim 15, comprising an epoxy sealant applied to at least a portion of an external surface of said washer.

23. The washer of claim 15, wherein said washer is for installation between a fastener and a substrate, to resist electrical arcing between said fastener and said substrate during a lightning strike.

\* \* \* \* \*